H. BEUNING.
QUACK GRASS DESTROYER.
APPLICATION FILED AUG. 21, 1920.
1,429,563.
Patented Sept. 19, 1922.
2 SHEETS—SHEET 2.
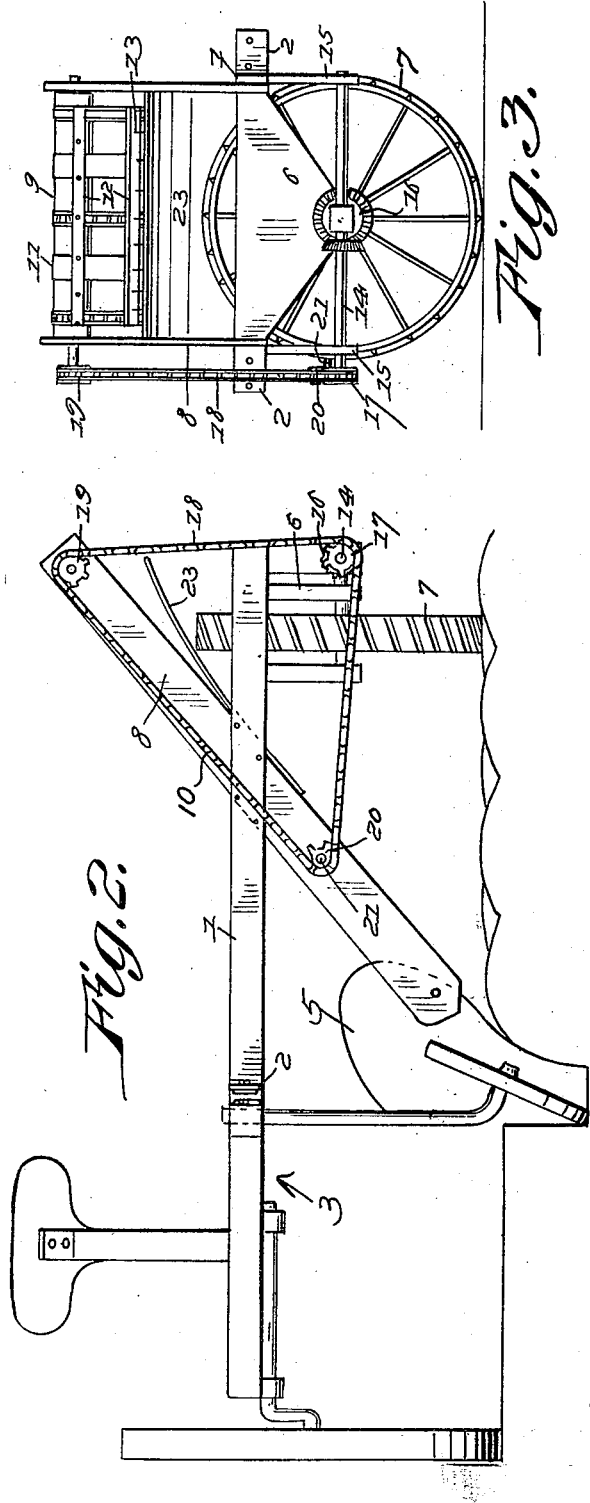
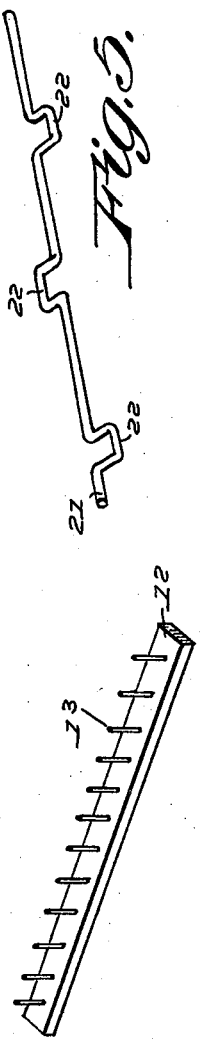
Henry Beuning,
By Wm. C. Linton
Attorney Patented Sept. 19, 1922.

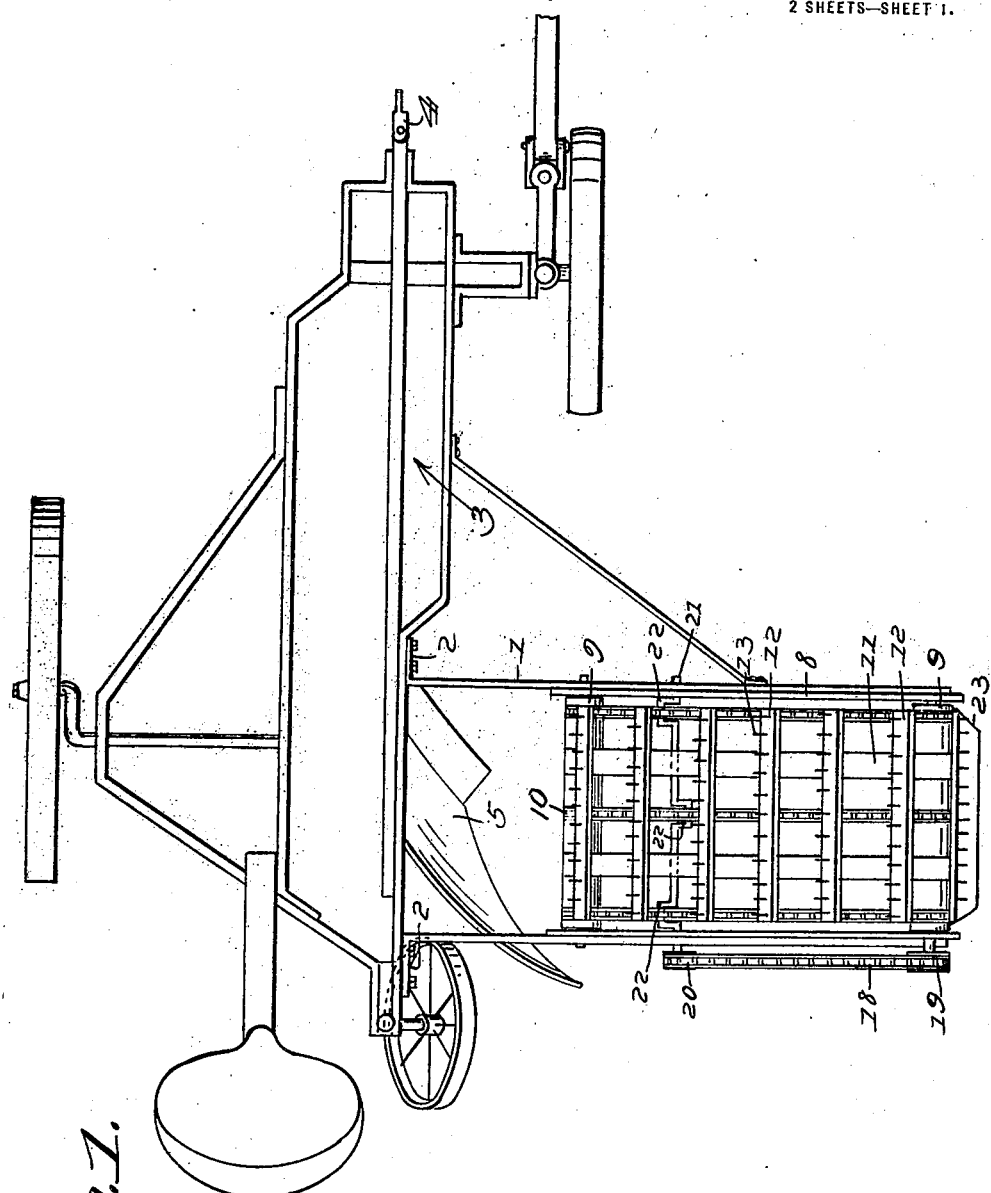

1,429,563

UNITED STATES PATENT OFFICE.

HENRY BEUNING, OF FREEPORT, MINNESOTA.

QUACK-GRASS DESTROYER.

Application filed August 21, 1920. Serial No. 405,159.

*To all whom it may concern:*

Be it known that I, HENRY BEUNING, a citizen of the United States, and a resident of Freeport, county of Stearns, State of Minnesota, have invented certain new and useful Improvements in Quack-Grass Destroyers; and I do hereby declare that the following is a full, clear, and exact description of the invention, such as will enable others skilled in the art to which it appertains to make and use the same.

The present invention has reference to improvements in grass destroying machines, having for an object to provide a machine which can be employed for removing so-called "quack" grass from a field in such a manner as to effect the destroying of the same, with the result that cultivation of the field will materially facilitate the growth of vegetation planted or growing therein.

It is also an object of my invention to provide a quack grass destroying machine which may be operated in conjunction with a wheeled cultivating plow, the plow obviously serving to turn the earth which is to be rid of the objectionable growths, thereby uprooting these growths and at the same time cutivating the soil.

Other objects of the invention will be in part obvious and in part pointed out hereinafter.

In order that the invention and its mode of operation may be readily understood by persons skilled in the art, I have in the accompanying illustrative drawings and in the following detailed description based thereon, set out one embodiment of the same.

Figure 1 is a plan illustrating my improved grass destroying machine when attached to an ordinary sulky plow;

Figure 2 is an end elevation of the same;

Figure 3 is a side elevation of my improved grass destroying machine;

Figure 4 is a perspective view of one of the teeth carrying slats; and,

Figure 5 is a perspective view of the crank shaft forming a part of the jigging means.

Having more particular reference to the drawings in connection with which like characters of reference will designate corresponding parts throughout, my improved grass destroying machine comprises a main frame 1, having flanged outer ends 2 adapted for connection with the wheeled frame 3 of a sulky plow or cultivator which, as will be noted, is provided with the usual draft connections 4 and carries thereon a plow 5, the mold board side of which is adjacent to the lower end of the endless conveying means, to be presently described.

It is to be noted that the main frame 1 is disposed at substantially right angles with relation to the frame of the plow 5 and in order that the outer end thereof may be properly supported, a crossbar 6 is arranged between the opposite sides of the outer portion of the frame in order to permit the rotatable mounting of a bull wheel 7 therein.

To provide means for separating the objectionable growths from the earth turned by the mold board of the plow 5 during movement of the machine over a field, an inclined frame 8 is mounted between the sides of the main frame 1 and has pulleys 9 mounted in its opposite ends, over which an endless conveyor 10 is adapted to ride, said conveyor comprising spaced belts 11 carrying thereon equi-distant transverse slats 12, which in turn are provided on their outer sides with a plurality of teeth 13 to facilitate engagement of the earth upon the conveyor. The lower end of the conveyor frame 8 is disposed in proximity to the mold board side of the plow 5 and in consequence, when the plow is moved through the soil or earth, the furrow turned thereby will be directed onto the lower end of the conveyor 10 and conveyed thereby upwardly for the separation of the earth from the growths to be destroyed. A transversely disposed shaft 14 is mounted in suitable bearings 15 of the outer end of the main frame 1, and has connection with the bull wheel 7 through bevelled gearing 16, while on the outer end of this shaft a sprocket wheel 17 is mounted and receives thereabout a sprocket chain 18, this sprocket chain in turn passing upwardly and over a sprocket wheel 19 mounted on one end of the shaft carrying the uppermost pulley or roller 9, and thence downwardly and over a sprocket wheel 20 mounted on one end of a shaft 21, the purpose of which will be hereinafter described. By reason of the connection of the chain 18 with the sprocket wheel 19 it will be appreciated that rotary motion will be conveyed to the endless conveyor 10, and in consequence, the same will be operated to convey the earth directed thereonto from the plow 5 upwardly over the upper or free end of the same.

It will be understood that the earth directed onto the endless conveyor 10 from the plow 5, will be in clods, and therefore means for breaking up these clods for facilitating the removal of the quack grass and other objectionable growths therefrom, are desirable. To this end, I form the shaft 21 with a plurality of offsets or cranks 22, which upon rotation of said shaft are adapted to impart sharp blows to the conveyor 10, thus, by reason of this jigging motion, breaking up the clods or pulverizing the same in order that the grass and other growths will be separated from the earth. The earth in this broken or pulverized form will, obviously, pass through the spaces occurring between the various belts 11, and by reason of the deflecting member 23 which is arranged under and disposed longitudinally of the upper portion of the conveyor frame 8, such earth will be returned to the surface of the field adjacent the furrow turned by the plow. The grass and other objectionable growths, however, will adhere to the conveyor 10 by reason of the teeth 13 of the slats 12 carried thereby, and ultimately will be discharged over the upper or free end of the conveyor, onto the field where, by reason of their exposure to the sun, they will be destroyed.

It is to be understood that my improved grass destroying machine may be used in conjunction with any form of earth-working means, such as conditions or preference may dictate, and, where the occasion may require, may be employed as an attachment to an earth-working or arrangement of earth-working means.

Manifestly, the construction shown is capable of considerable modification, and such modification as is within the scope of my claims I consider within the spirit of my invention.

I claim:

1. A grass destroying machine, comprising the combination with a wheeled plow, having a plow share and a supporting frame therefor, of a horizontally disposed main frame having one end thereof connected to the frame of the wheeled plow and arranged at substantially right angles to one side thereof, said main frame consisting of a pair of parallel bars, a cross bar arranged between the opposite sides of the outer portions of said parallel bars, a drive wheel supported within said main frame and rotatably supported by said cross bar, an inclined frame supported between the sides of said main frame and extending upwardly therefrom, the outer end of said inclined frame being arranged at a point beyond the adjacent end of the main frame, an endless conveying means carried by said inclined frame, the lower end of the conveying means being arranged in proximity to the earth-turning side of the plow share whereby to receive the earth turned thereby in said lower end, said conveying means comprising a plurality of belts, a plurality of teeth carrying slats connected to and arranged transversely of said belts, pulleys arranged in said inclined frame over which said belts pass, means for operatively connecting one of said pulleys with said drive wheel whereby upon the travel of said drive wheel over the ground said endless conveying means will be set in operation, a jigging means arranged in said inclined frame, said jigging means consisting of a crank shaft adapted to engage the belts of said endless conveying means and means for operatively connecting said crank shaft to said drive wheel, substantially as and for the purpose specified.

2. A grass destroying machine, comprising the combination with earth working means, said earth working means comprising a supporting frame, of a horizontally disposed main frame connected to the supporting frame of the earth working means and arranged at substantially right angles to one side thereof, a drive wheel supported in the outer end of said main frame, an inclined frame supported between the sides of said main frame and extending upwardly therefrom, the outer end of said inclined frame being arranged at a point beyond the adjacent end of said main frame, endless conveying means carried by said inclined frame, means for connecting said conveying means with the drive wheel whereby to impart rotary motion thereto, the lower end of the conveying means being arranged in proximity to the earth turning side of the earth working means whereby to receive the earth turned thereby in said lower end, jigging means carried by the inclined frame for imparting vibratory motion to said conveying means, and a curved deflecting member carried by the inclined frame and disposed longitudinally of the same for a portion of its length, adapted to receive the earth discharged from said conveying means and return the same to a point adjacent the point of travel of the earth working means, substantially as and in the manner specified.

In witness whereof I have hereunto set my hand.

HENRY BEUNING.